US012137002B2

(12) United States Patent
Lei et al.

(10) Patent No.: US 12,137,002 B2
(45) Date of Patent: Nov. 5, 2024

(54) METHOD AND APPARATUS FOR DETERMINING ENHANCED DYNAMIC HARQ-ACK CODEBOOK

(71) Applicant: Lenovo (Beijing) Ltd., Beijing (CN)

(72) Inventors: Haipeng Lei, Haidian District (CN); Yu Zhang, Haidian District (CN)

(73) Assignee: Lenovo (Beijing) Ltd., Beijing (CN)

(*) Notice: Subject to any disclaimer, the term of this patent is extended or adjusted under 35 U.S.C. 154(b) by 16 days.

(21) Appl. No.: 17/774,946

(22) PCT Filed: Nov. 19, 2019

(86) PCT No.: PCT/CN2019/119415
§ 371 (c)(1),
(2) Date: May 6, 2022

(87) PCT Pub. No.: WO2021/097656
PCT Pub. Date: May 27, 2021

(65) Prior Publication Data
US 2022/0393801 A1    Dec. 8, 2022

(51) Int. Cl.
*H04L 1/18*      (2023.01)
*H04L 1/1812*    (2023.01)
*H04L 5/00*      (2006.01)

(52) U.S. Cl.
CPC .......... *H04L 1/1812* (2013.01); *H04L 5/0044* (2013.01); *H04L 5/0055* (2013.01); *H04L 5/0094* (2013.01)

(58) Field of Classification Search
CPC ... H04L 1/1812; H04L 5/0044; H04L 5/0055; H04L 5/0094
See application file for complete search history.

(56) References Cited

U.S. PATENT DOCUMENTS 9,461,780 B2 * 10/2016 Liang .................... H04L 1/1812
2015/0117271 A1 * 4/2015 Liang .................... H04L 5/0055
                                                           370/280
(Continued)

FOREIGN PATENT DOCUMENTS

CN    110086583 A    8/2019
WO    2019144833 A1  8/2019
(Continued)

OTHER PUBLICATIONS

Mediatek Inc., "Enhancements to HARQ for NR-U operation", 3GPP TSG RAN WG1 #96bis, R1-1904484, Xi'an, China [retrieved Jun. 23, 2022]. Retrieved from the Internet <https://www.3gpp.org/ftp/TSG_RAN/WG1_RL1/TSGR1_96b/Docs/>, Apr. 2019, 12 pages.
(Continued)

*Primary Examiner* — Samir W Rizk
(74) *Attorney, Agent, or Firm* — FIG. 1 Patents

(57) ABSTRACT

The subject disclosure relates to a method and apparatus for determining an enhanced dynamic HARQ-ACK codebook. One embodiment of the subject disclosure provides a method including: receiving first Downlink Control Information (DCI) scheduling a first Physical Downlink Shared Channel (PDSCH); determining an index of a first PDSCH group and whether new Hybrid Automatic Repeat reQuest Acknowledgement (HARQ-ACK) feedback is requested for the first PDSCH group, wherein the first PDSCH group includes at least the first PDSCH; and transmitting a first HARQ-ACK codebook for the first PDSCH group, wherein the first HARQ-ACK codebook comprises HARQ-ACK feedback for each PDSCH of the first PDSCH group.

20 Claims, 11 Drawing Sheets

(56) References Cited

U.S. PATENT DOCUMENTS

| | | | |
|---|---|---|---|
| 2019/0363840 A1 | 11/2019 | Wang et al. | |
| 2022/0256573 A1* | 8/2022 | Frenne | H04L 5/0053 |
| 2023/0171773 A1* | 6/2023 | Yang | H04W 72/23 |
| | | | 370/329 |
| 2023/0179342 A1* | 6/2023 | Zhang | H04L 1/1854 |
| | | | 370/329 |

FOREIGN PATENT DOCUMENTS

| | | | |
|---|---|---|---|
| WO | 2019192715 A1 | 10/2019 | |
| WO | 2019213957 A1 | 11/2019 | |

OTHER PUBLICATIONS

PCT/CN2019/119415 , "International Preliminary Report on Patentability", PCT Application No. PCT/CN2019/119415, Jun. 2, 2022, 5 pages.
PCT/CN2019/119415 , "International Search Report and Written Opinion", PCT Application No. PCT/CN2019/119415, Jul. 29, 2020, 6 pages.
Samsung , "HARQ enhancements for NR-U", 3GPP TSG RAN WG1 #98, R1-1908467, Prague, CZ [retrieved Jun. 23, 2022]. Retrieved from the Internet <https://www.3gpp.org/ftp/tsg_ran/WG1_RL1/TSGR1_98/Docs>, Aug. 2019, 8 pages.
19953265.6 , "Extended European Search Report", EP Application No. 19953265.6, Jul. 3, 2023, 6 pages.
201980101930.7 , "Foreign Office Action", CN Application No. 201980101930, Sep. 9, 2023, 9 pages.
201980101930.7 , "Notice of Decision to Grant", CN Application No. 201980101930.7, Mar. 22, 2024, 3 pages.

* cited by examiner

| 1st NFB-DCI | 2nd FB-DCI | 3rd NFB-DCI | 4th NFB-DCI | |
|---|---|---|---|---|
| C-DAI=1<br>GI=0<br>NFI=0 | C-DAI=2 | C-DAI=3<br>GI=0<br>NFI=0 | C-DAI=4<br>GI=0<br>NFI=0 | U1 |
| 400-1 | 400-2 | 400-3 | 400-4 | |

Figure 4

METHOD AND APPARATUS FOR DETERMINING ENHANCED DYNAMIC HARQ-ACK CODEBOOK

TECHNICAL FIELD

The subject application relates to the 3$^{rd}$ Generation Partnership Project (3GPP) 5G new radio (NR), especially to a method and apparatus for determining an enhanced dynamic Hybrid Automatic Repeat reQuest Acknowledgement (HARQ-ACK) codebook.

BACKGROUND OF THE INVENTION

For enhanced dynamic HARQ-ACK codebook, Physical Downlink Shared Channel (PDSCH) grouping is indicated by the Group Index (GI) of a scheduled PDSCH scheduled by the Downlink Control Information (DCI). New ACK-Feedback Group Indicator (NFI) is used to indicate the User Equipment (UE) whether HARQ-ACK feedback for the indicated PDSCH group is required to be retransmitted or to be discarded.

However, for the fallback DCI, for example, DCI format 1_0, which does not include a GI or NFI, the UE cannot determine the GI and NFI of the PDSCH scheduled by the fallback DCI, and cannot determine the enhanced dynamic HARQ-ACK codebook based on such DCI.

Accordingly, it is desirable to provide a solution for the UE to determine the enhanced dynamic HARQ-ACK codebook.

SUMMARY

It is desirable to provide a solution for the UE to determine the enhanced dynamic HARQ-ACK codebook.

One embodiment of the subject application provides a method including: receiving first Downlink Control Information (DCI) scheduling a first Physical Downlink Shared Channel (PDSCH); determining an index of a first PDSCH group and whether new Hybrid Automatic Repeat reQuest Acknowledgement (HARQ-ACK) feedback is requested for the first PDSCH group, wherein the first PDSCH group includes at least the first PDSCH; and transmitting a first HARQ-ACK codebook for the first PDSCH group, wherein the first HARQ-ACK codebook comprises HARQ-ACK feedback for each PDSCH of the first PDSCH group.

Another embodiment of the subject application provides a method including: transmitting first Downlink Control Information (DCI) scheduling a first Physical Downlink Shared Channel (PDSCH), wherein the first PDSCH is included in a first PDSCH group; transmitting a first indicator indicating an index of the first PDSCH group and a second indicator indicating whether new Hybrid Automatic Repeat reQuest Acknowledgement (HARQ-ACK) feedback is requested for the first PDSCH group; and receiving a first HARQ-ACK codebook for the first PDSCH group, wherein the first HARQ-ACK codebook comprises HARQ-ACK feedback for each PDSCH of the first PDSCH group.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including: receiving first Downlink Control Information (DCI) scheduling a first Physical Downlink Shared Channel (PDSCH); determining an index of a first PDSCH group and whether new Hybrid Automatic Repeat reQuest Acknowledgement (HARQ-ACK) feedback is requested for the first PDSCH group, wherein the first PDSCH group includes at least the first PDSCH; and transmitting a first HARQ-ACK codebook for the first PDSCH group, wherein the first HARQ-ACK codebook comprises HARQ-ACK feedback for each PDSCH of the first PDSCH group.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including: transmitting first Downlink Control Information (DCI) scheduling a first Physical Downlink Shared Channel (PDSCH), wherein the first PDSCH is included in a first PDSCH group; transmitting a first indicator indicating an index of the first PDSCH group and a second indicator indicating whether new Hybrid Automatic Repeat reQuest Acknowledgement (HARQ-ACK) feedback is requested for the first PDSCH group; and receiving a first HARQ-ACK codebook for the first PDSCH group, wherein the first HARQ-ACK codebook comprises HARQ-ACK feedback for each PDSCH of the first PDSCH group.

BRIEF DESCRIPTION OF THE DRAWINGS

FIG. 4 illustrates one enhanced dynamic HARQ-ACK codebook determination with PDSCHs scheduled by fallback DCI according to some embodiments of the subject disclosure.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for downlink (DL) or uplink (UL) data transmission on unlicensed spectrum. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
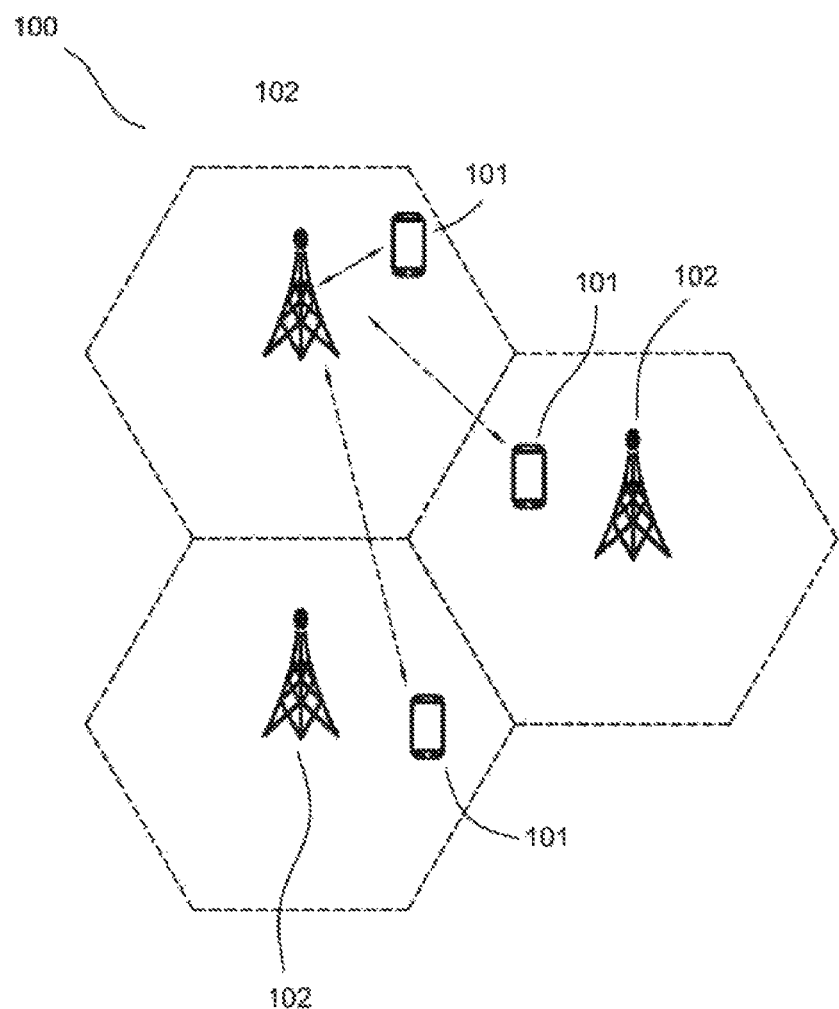
FIG. 1 illustrates a schematic diagram of a wireless communication system in accordance with some embodiments of the subject disclosure.

FIG. 1 illustrates a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using 3GPP 5G protocols.

Regarding HARQ enhancement for NR-U, enhanced dynamic HARQ-ACK codebook is specified in Rel-16 with anew concept of PDSCH grouping. The PDSCH grouping is explicitly indicated by a Group Index (GI) in the DCI which schedules the PDSCH. HARQ-ACK feedback for all the PDSCHs in the same group is carried in the same PUCCH. The maximum number of PDSCH groups is 2, which is not configured by RRC signaling.

Since one PDSCH group may or may not include the earlier PDSCHs with the corresponding HARQ-ACK feedback reported in previous transmission in addition to newly scheduled PDSCHs, the number of PDSCHs in the same group may be changed. As a result, the number of HARQ-ACK bits for one PDSCH group can change between successive requests for HARQ-ACK feedback for the same PDSCH group.

New ACK-Feedback Group Indicator (NFI) is indicated in the non-fallback DCI, for example, DCI 1_1, which schedules the PDSCH for the scheduled group. The NFI for each PDSCH group operates as a toggle bit. For example, if the value of the NFI in previous DCI is "0", and the UE receives a new DCI with the NFI value being "1", which means that the NFI is toggled, similarly, if the value of the NFI in previous DCI is "1", and the UE receives a new DCI with the NFI value being "0", it also means that the NFI is toggled. Specifically, if one DCI is received that toggles the NFI for a PDSCH group, then the UE discards the HARQ-ACK feedback for the PDSCH(s) in that PDSCH group including the PDSCH(s) that were associated with an indicator which indicates the timing from a PDSCH to the HARQ feedback, i.e., the PDSCH-to-HARQ_feedback timing indicator, for example, a non-numerical K1 value.

It should be noted that the HARQ-ACK feedback for PDSCH(s) scheduled by this DCI are not discarded, and the UE expects the Downlink Assignment Index (DAI) values for the PDSCH group is reset.

Counter-DAI (C-DAI)/Total-DAI (T-DAI) is accumulated only within each PDSCH group. T-DAI is indicated in non-fallback DCI scheduling PDSCH for the scheduled group if more than one DL cell is configured.

One DCI can request HARQ-ACK feedback for one or more PDSCH groups in the same PUCCH. Indication of NFI and T-DAI in non-fallback DCI for the non-scheduled group with single or multiple configured DL cells can be configured by Radio Resource Control (RRC). The presence of Uplink (UL) DAI for an additional PDSCH group in the non-fallback DCI can be configured by RRC signalling.

Figure 2:
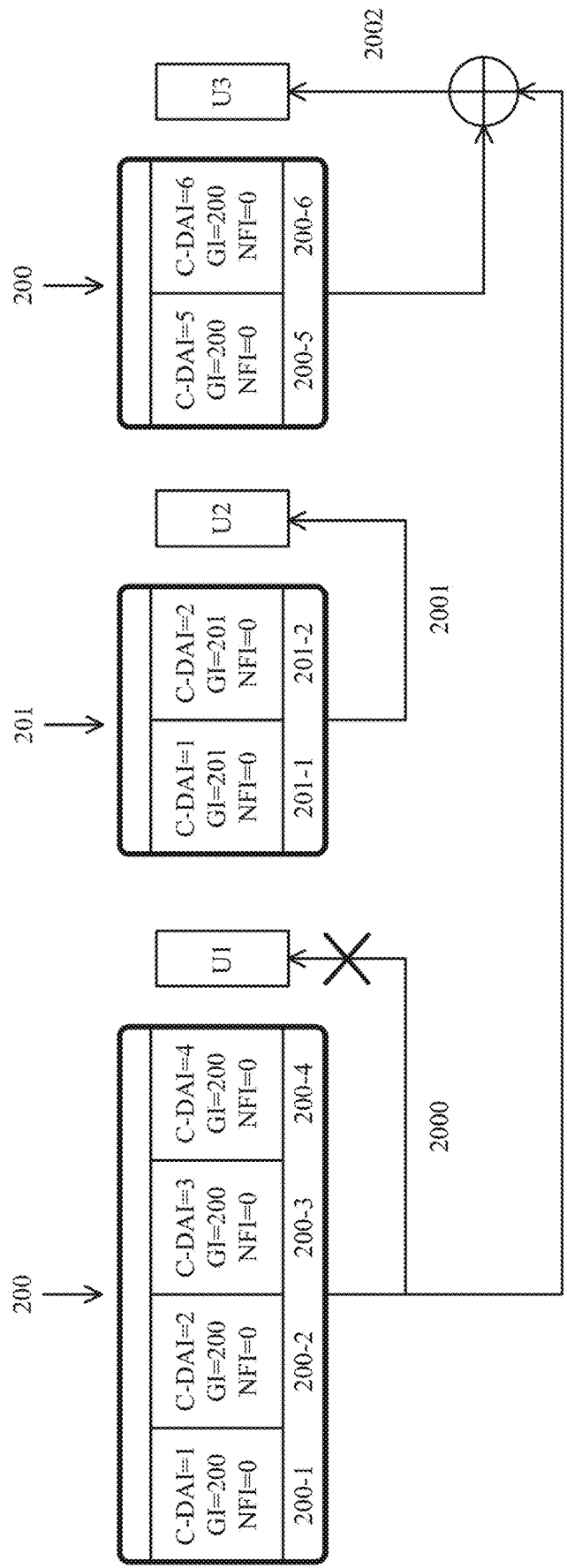
FIG. 2 illustrates one enhanced dynamic HARQ-ACK codebook determination for the same PDSCH group in one PUCCH.

FIG. 2 illustrates one HARQ-ACK codebook determination for the same PDSCH group in one PUCCH.

In FIG. 2, the PDSCH group 200 includes four PDSCHs, PDSCH 200-1, PDSCH 200-2, PDSCH 200-3 and PDSCH 200-4, each PDSCH in the PDSCH group 200 is indicated by the group index 200, and has the associated C-DAI 1, 2, 3, and 4, respectively. For example, the value of the C-DAI of PDSCH 200-1 is 1, the value of GI is 200, and the value of New Feedback Indicator (NFI) is 0. The PUCCH which carries the HARQ-ACK codebook 2000 corresponding to the four PDSCHs is transmitted in slot U1.

FIG. 2 also depicts a PDSCH group 201, which includes two PDSCHs, PDSCH 201_1 and PDSCH 201-2. Each PDSCH in the PDSCH group 201 is indicated by the group index 201, and the values of the associated C-DAI are 1 and 2, respectively. The PUCCH which carries the HARQ-ACK codebook 2001 corresponding to the two PDSCHs is transmitted in slot U2.

If the UE fails to transmit the PUCCH carrying the HARQ-ACK codebook 2000 to the BS due to Listen Before Talk (LBT) failure, or the BS incorrectly decodes the PUCCH carrying the HARQ-ACK codebook 2000 due to interference, for example, hidden node interference, the BS would request the UE to retransmit the HARQ-ACK codebook 2000 in a subsequent slot, e.g., slot U3, together with the HARQ-ACK feedback corresponding to two newly scheduled PDSCHs, e.g., PDSCH 200-5 and PDSCH 200-6 in the PDSCH group 200. In FIG. 2, the GI of PDSCH 200-5 is 200, the value of the associated DAI for PDSCH 200-5 is 5, the NFI of PDSCH 200-5 is 0, the GI of PDSCH 200-6 is 200, the value of the associated DAI for PDSCH 200-6 is 6, and the NFI of PDSCH 200-6 is 0.

Therefore, the value of the GI for the PDSCH 200-1, 200-2, 200-3, and 200-4 and the value of the GI for the PDSCH 200-5 and 200-6 are identical, the value of the NFI of the PDSCH 200-1, 200-2, 200-3, and 200-4 and the value of the NFI of the PDSCH 200-5 and 200-6 are non-toggled, and the value of the DAI follows the DAI associated with the last PDSCH in the same group 200.

Based on the same PDSCH group index, non-toggled NFI and updated DAI following the DAI associated with the last PDSCH in the same group, the UE knows the retransmission of HARQ-ACK codebook 2000 corresponding to four PDSCHs in the same PDSCH group is requested. Hence, from the UE's perspective, PDSCH group 200 should be updated by including the newly scheduled PDSCHs, PDSCH 200-5 and 200-6, and previously transmitted PDSCHs, 200-1, 200-2, 200-3, and 200-4, in the same PDSCH group. Accordingly, UE shall generate a new HARQ-ACK codebook 2002 including HARQ-ACK feedback for PDSCH 200-1, PDSCH 200-2, PDSCH 200-3, PDSCH 200-4, PDSCH 200-5 and PDSCH 200-6, for PDSCH group 200, and transmit the new HARQ-ACK codebook 2002 in one PUCCH in slot U3.

Needless to say, due to retransmission of HARQ-ACK feedback for previous PDSCHs, the size of PDSCH group 200 is increased. The size of the HARQ-ACK codebook 2002 for PDSCH group 200 is also increased because of successive requests for HARQ-ACK feedback. As shown in FIG. 2, without consideration of DL two-codeword transmission, carrier aggregation, and CBG-based retransmission, the size of the HARQ-ACK codebook 2000 is 4 for previous PDSCH group 200, and the size of the HARQ-ACK codebook 2002 is 6 for new PDSCH group 200. If the UE still fails to transmit the PUCCH carrying the HARQ-ACK codebook 2002 to the BS due to Listen Before Talk (LBT) failure, or the BS still incorrectly decodes the PUCCH carrying the HARQ-ACK codebook 2002 due to interference, then the size of the PDSCH group might be further increased.

Figure 3:
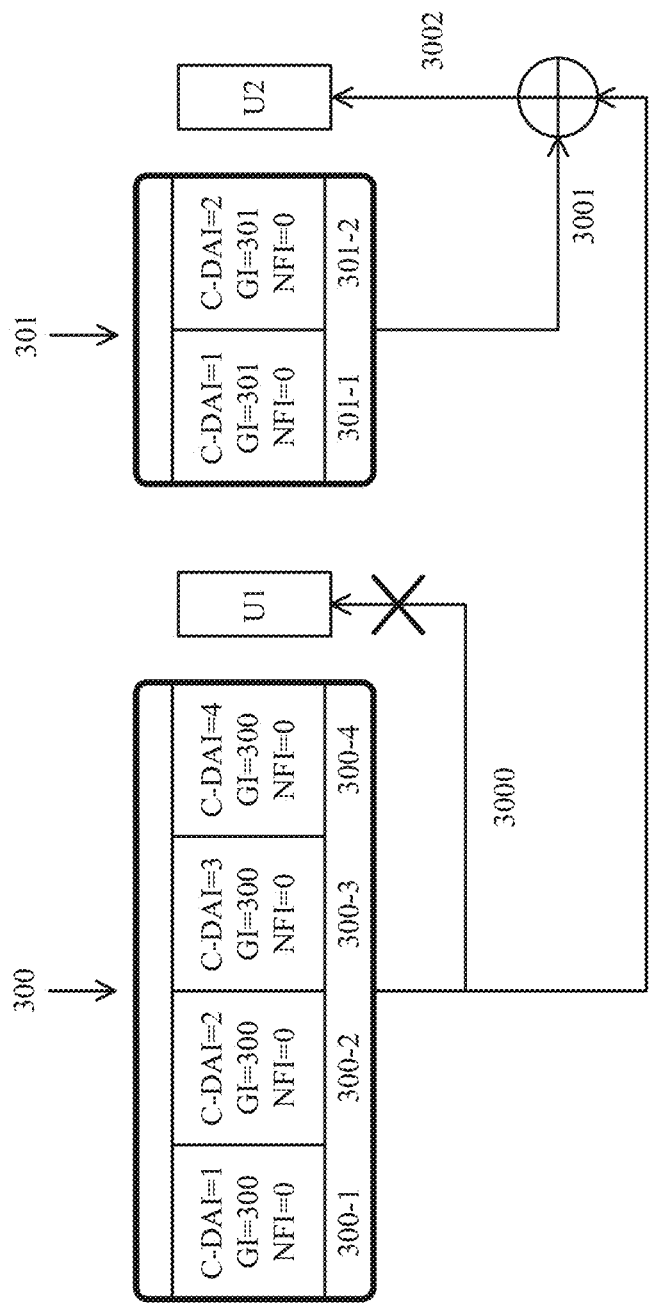
FIG. 3 illustrates one HARQ-ACK codebook determination for two PDSCH groups in one PUCCH.

Regarding the situation that the BS requests HARQ-ACK feedback for all PDSCHs in the different PDSCH groups in the same PUCCH, FIG. 3 illustrates one HARQ-ACK codebook determination for two PDSCH groups in one PUCCH. According to the present agreement, one DCI can request HARQ-ACK feedback for one or more PDSCH groups in the same PUCCH. As shown in FIG. 3, assuming the transmission of HARQ-ACK codebook 3000 for PDSCH group 300 is failed, when the BS schedules PDSCH transmission for PDSCH group 301, the BS can request the retransmission of the HARQ-ACK feedback for PDSCH group 300 together with the initial transmission of HARQ-ACK feedback for PDSCH group 301 in the same HARQ-ACK codebook 3002. As explained above, the combination of HARQ-ACK feedback for two PDSCH groups in the same HARQ-ACK codebook further increases the size of the HARQ-ACK codebook.

FIG. 4 illustrates one enhanced dynamic HARQ-ACK codebook determination for the same PDSCH group which includes PDSCH scheduled by fallback DCI. In FIG. 4, there are four PDSCHs, PDSCH 400-1, PDSCH 400-2, PDSCH 400-3 and PDSCH 400-4, the PDSCH 400-1, PDSCH 400-3 and PDSCH 400-4 are scheduled by the $1^{st}$ non-fallback DCI, the $3^{rd}$ non-fallback DCI, and the $4^{th}$ non-fallback DCI, and the PDSCH 400-2 is scheduled by the $2^{nd}$ fallback DCI. The associated C-DAI for the four PDSCHs are 1, 2, 3, and 4, respectively. The value of GI and the value of NFI for the $1^{st}$ non-fallback DCI, the $3^{rd}$ non-fallback DCI, and the $4^{th}$ non-fallback DCI are 400 and 0 respectively. The feedback for the four PDSCHs is to be transmitted in the slot U1.

The $2^{nd}$ fallback DCI, e.g. the DCI format 1_0, is supposed to be reliable enough and does not include any configurable field so as to avoid the ambiguity of RRC configuration or RRC reconfiguration. Therefore, there is no GI in the fallback DCI. For simplicity, suppose the PDSCH scheduled by DCI format 1_0 belongs to a default group, PDSCH group 0, thus the UE reports the HARQ-ACK feedback for the corresponding PDSCH as part of the PDSCH group 0. However, the fallback DCI also does not include the NFI, which is used to indicate the UE whether the HARQ-ACK feedback for the indicated PDSCH group is required to be retransmitted or to be discarded.

Accordingly, it is needed to provide solutions for the UE to determine whether the HARQ-ACK feedback for PDSCH scheduled by fallback DCI is to be retransmitted or discarded.

In this disclosure, several solutions are proposed for determining the enhanced dynamic HARQ-ACK codebook with the PDSCHs scheduled by the fallback DCI for NR access on unlicensed spectrum (NR-U).

In one preferred embodiment, maximum 3 PDSCH groups are supported for enhanced dynamic HARQ-ACK codebook, i.e., PDSCH group 0, PDSCH group 1 and PDSCH group 2. The PDSCHs scheduled by the fallback DCI, i.e., DCI format 1_0, always belong to PDSCH group 0. The PDSCHs scheduled by non-fallback DCI, i.e., DCI format 1_1, may belong to PDSCH group 1 or PDSCH group 2.

The GI included in the non-fallback DCI indicates the group which is scheduled by the non-fallback DCI. The size of the GI in non-fallback DCI is 1 bit, if the value of the bit is set to "0", it indicates PDSCH group 1, and the value "1" indicates PDSCH group 2, or vice versa. Suppose the GI indicates PDSCH group 1, then from the perspective of this non-fallback DCI, the PDSCH group 1 is the scheduled group by this non-fallback DCI, and there are two other PDSCH groups, PDSCH group 0 and PDSCH group 2, are the other non-scheduled groups, i.e., not scheduled by this non-fallback DCI. In this embodiment, a new indicator, Request Indicator (RI) is introduced into this non-fallback DCI, for indicating whether other group(s) is requested. That is, with the RI and GI, the non-fallback DCI can indicate both the scheduled group and the other groups.

The RI may indicate the index of the non-scheduled PDSCH group(s), or the number of PDSCH groups, with the corresponding HARQ-ACK feedback requested in the same HARQ-ACK codebook, i.e., the same PUCCH.

Since there are 3 PDSCH groups, 2 bits are needed for the RI to indicate the 3 groups. In one embodiment, two-bit RI indicates the group index or indexes which are requested for HARQ-ACK feedback transmission. For instance, bit "00" indicates that only the HARQ-ACK feedback for scheduled group is requested, which is the group with GI indicated in the non-fallback DCI; bit "01" indicates HARQ-ACK feedback for both scheduled group and the default group, i.e., group 0 are requested; bit "10" indicates HARQ-ACK feedback for both group 1 and group 2 are requested; bit "11" indicates HARQ-ACK feedback for all the three groups are requested.

One example is shown in Table 1 below. In the second column in Table 1, the value of GI indicated in the non-fallback DCI is "0", which suggests that the PDSCH group 1 is requested. When the bits of RI are "00", then the non-fallback DCI only requests the HARQ-ACK feedback for PDSCH group 1. When the bits of RI are "01", then the non-fallback DCI requests the HARQ-ACK feedback for PDSCH group 0 and PDSCH group 1. When the bits of RI are "10", then the non-fallback DCI requests the HARQ-ACK feedback for PDSCH group 1 and PDSCH group 2. When the bits of RI are "11", then the non-fallback DCI requests the HARQ-ACK feedback for PDSCH group 0, PDSCH group 1, and PDSCH group 2. In the third column, the value of GI is one, the PDSCH groups are requested in a similar fashion.

TABLE 1

| | group index(es) requested | |
|---|---|---|
| The bits in RI | GI = 0 (PDSCH group 1) | GI = 1 (PDSCH group 2) |
| 00 | 1 | 2 |
| 01 | 0, 1 | 0, 2 |
| 10 | 1, 2 | 1, 2 |
| 11 | 0, 1, 2 | 0, 1, 2 |

It should be noted that the above corresponding relationship between the bits in RI and the requested group could be adjusted in any manner, for example, the bits "00" may suggest that the non-fallback DCI requests the HARQ-ACK feedback for PDSCH group 1 and PDSCH group 2, instead of PDSCH group 1 as shown in column 2 of Table 1. The subject disclosure has no intention of limiting the corresponding relationship between the bits in RI and the requested group.

In another embodiment, two-bit RI indicates the number of PDSCH groups for HARQ-ACK feedback transmission. Therefore are four different cases: 1) in case the value of RI is equal to 1, it indicates HARQ-ACK feedback only for a single group is requested, which is the group with GI indicated in the non-fallback DCI; 2) in case the value of RI is equal to 2, it indicates HARQ-ACK feedback for two PDSCH groups is requested, i.e., the scheduled group and another non-default group, which are group 1 and group 2; 3) in case the value of RI is equal to 3, it indicates HARQ-ACK feedback for three PDSCH groups is requested, i.e., group 0, group 1 and group 2; and 4) in case the value of RI is equal to 4, it indicates HARQ-ACK feedback for two PDSCH groups is requested, i.e., the scheduled group and the default group, i.e., group 0. Here, the value of RI is equal to the value of the two bits plus one. Alternatively, the two bits of the RI correspond to a value from a set of values {1, 2, 3, 4}.

One example is shown in Table 2 below. In the second column in Table 2, the value of GI indicated in the non-fallback DCI is "0", which suggests that the PDSCH group 1 is requested. When the value of RI is 1, then the non-fallback DCI only requests the HARQ-ACK feedback for one PDSCH group, PDSCH group 1. When the value of RI is 2, then the non-fallback DCI requests the HARQ-ACK feedback for two PDSCH groups, PDSCH group 1 and PDSCH group 2. When the value of RI is 3, then the non-fallback DCI requests the HARQ-ACK feedback for three PDSCH groups, PDSCH group 0, PDSCH group 1, and PDSCH group 2. When the value of RI is 4, then the non-fallback DCI requests the HARQ-ACK feedback for two PDSCH groups, PDSCH group 1 and PDSCH group 0. When the value of GI is "1", the PDSCH groups are requested in a similar fashion.

TABLE 2

| | the number of PDSCH groups | |
|---|---|---|
| The value of RI | GI = 0 (PDSCH group 1) | GI = 1 (PDSCH group 2) |
| 1 | 1 | 2 |
| 2 | 1, 2 | 1, 2 |
| 3 | 0, 1, 2 | 0, 1, 2 |
| 4 | 1, 0 | 2, 0 |

It should be noted that the above corresponding relationship between the value of RI and the requested group could be adjusted in any manner, for example, the value 1 may suggest that the non-fallback DCI requests the HARQ-ACK feedback for two groups, PDSCH group 1 and PDSCH group 2, instead of PDSCH group 1 as shown in column 2 of Table 2. The subject disclosure has no intention of limiting the corresponding relationship between the value of RI and the requested group.

In the subject disclosure, the non-fallback DCI includes the following indicators:
1) the Group index (GI) for the scheduled group, which has one bit, bit "0" represents Group 0, and bit "1" represents Group 1;
2) the NFI for the scheduled group, which has one bit;
3) RI: Number of requested groups, which has one bit, bit "0" represents only the scheduled group, and bit "1" represents two groups.
4) C-DAI for the scheduled group, which has two bits;
5) T-DAI for the scheduled group, which has two bits if more than one DL cell is configured;
6) NFI for the non-scheduled group, may be present according to different solutions, and has 1 bit; and
7) T-DAI for the non-scheduled group, may be present according to different solutions, and has 2 bit.

Since DCI format 1_0, which indicates PDSCH group 0, is reliable enough, T-DAI for PDSCH group 0 is not included in the non-fallback DCI. NFI for PDSCH group 0 is included in the non-fallback DCI. NFI for PDSCH group 0 is not included in the fallback DCI. NFI for PDSCH group 0 is toggled or not-toggled only based on the non-fallback DCI.

In another preferred embodiment, maximum 2 PDSCH groups, PDSCH group 0 and PDSCH group 1, are supported for enhanced dynamic HARQ-ACK codebook. The PDSCHs scheduled by the fallback DCI, i.e., DCI format 1_0, always belong to the default PDSCH group, PDSCH group 0. HARQ-ACK feedback for PDSCH scheduled by fallback DCI is always assumed to be postponed. The field, PDSCH-to-HARQ_feedback timing indicator in the fallback DCI, which is used to indicate the timing from the PDSCH to the HARQ feedback, has three bits, and one of the three bits is reused as one bit NFI. That is to say, the fallback DCI in this embodiment includes NFI. For example, in FIG. 5A, the 1$^{st}$ fallback DCI (FB-DCI) includes C-DAI and NFI bits.

The next non-fallback DCI (the 2$^{nd}$ NFB-DCI in FIG. 5A) which has a GI value of 0 and has valid PDSCH to HARQ timing indication can request HARQ-ACK feedback for the PDSCH group 0, which includes the PDSCHs scheduled by fallback DCI and non-fallback DCI. It should be noted that if the next DCI is not a non-fallback DCI, but still is a fallback DCI, the fallback DCI cannot request HARQ-ACK feedback for the PDSCH group 0.

In this embodiment, the NFI bit in the DCI format 1_0 can be toggled or not toggled compared to previous DCI indicating same PDSCH group index if the counter DAI in the DCI format 10 is reset to the initial value, i.e., the value of counter DAI is equal to the initial value, i.e., 0 or 1. The NFI bit in fallback DCI is not toggled compared to previous DCI indicating same PDSCH group index if the counter DAI in the fallback DCI is not reset to the initial value, namely, the value of counter DAI is greater than the initial value, i.e., 0 or 1. The value of the counter DAI in the next non-fallback DCI indicating group 0 and valid PDSCH to HARQ timing indication follows the value of the counter DAI in the fallback DCI. For example, in FIG. 5A, the value of the C-DAI in the 1$^{st}$ FB-DCI is 1, and the value of the C-DAI in the 2$^{nd}$ NFB-DCI is 2.

In another preferred embodiment, the field, PDSCH-to-HARQ_feedback timing indicator in the fallback DCI, which is used to indicate the timing from the PDSCH to the HARQ feedback, has 3 bits, and the three bits are reused as one bit group index, one bit NFI, and one bit RI. That is to say, the fallback DCI in this embodiment includes a GI, a NFI, and a RI. For example, in FIG. 5B, the Pt fallback DCI (FB-DCI) includes a C-DAI, a GI, a NFI, and a RI.

Figure 5A:
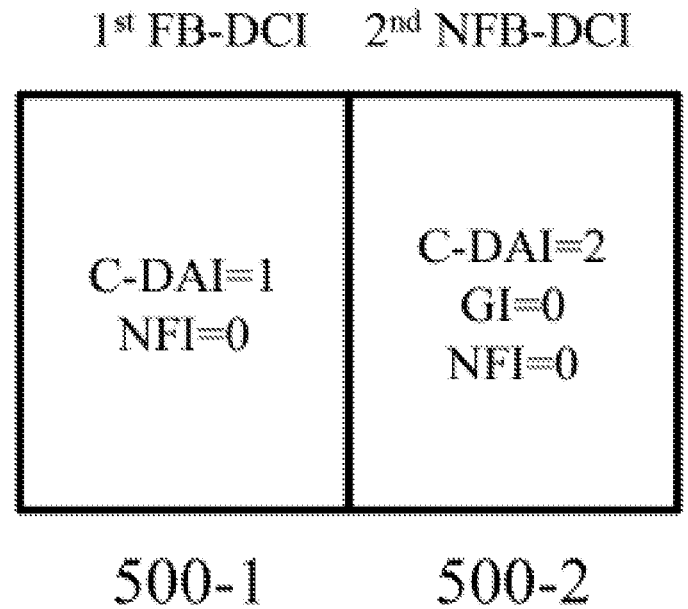
FIG. 5A illustrates one enhanced dynamic HARQ-ACK codebook determination with PDSCHs scheduled by fallback DCI according to some embodiments of the subject disclosure.
Figure 5B:
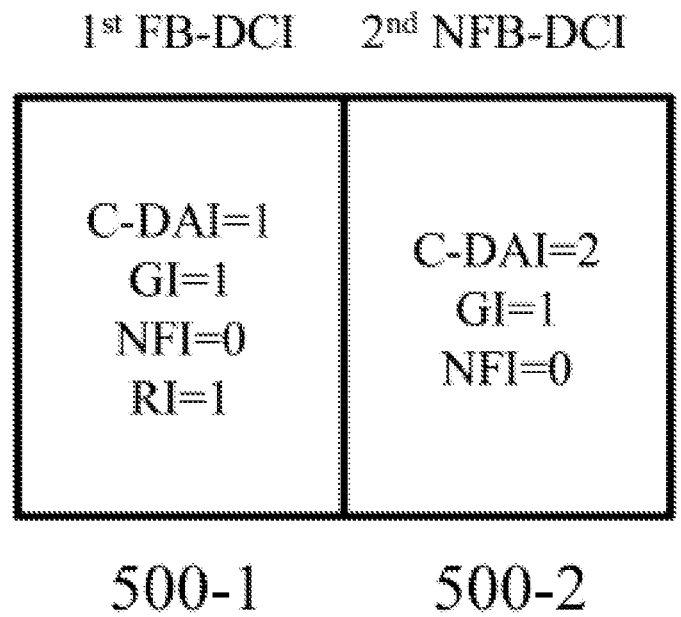
FIG. 5B illustrates one enhanced dynamic HARQ-ACK codebook determination with PDSCHs scheduled by fallback DCI according to some embodiments of the subject disclosure.

Since the fallback DCI has one bit GI, the fallback DCI can indicate the group index of the scheduled PDSCH, for example, in FIG. 5B, the PDSCH scheduled by the 1$^{st}$ fallback DCI belongs to group 1, and the value of GI equals to 1. The next non-fallback DCI (the 2$^{nd}$ NFB-DCI) which has the same group number, namely, the value of GI also equals to 1, and has valid PDSCH to HARQ timing indication can request HARQ-ACK feedback for the PDSCH group 0 including the PDSCHs scheduled by fallback DCI and non-fallback DCI. It should be noted that if the next DCI is not a non-fallback DCI, but still is a fallback DCI, the fallback DCI cannot request HARQ-ACK feedback for the PDSCH group 1.

In this embodiment, the NFI bit in the fallback DCI can be toggled or not toggled compared to previous DCI indicating same PDSCH group index if the counter DAI in the fallback DCI is reset to the initial value, i.e., the value of counter DAI is equal to the initial value, i.e., 0 or 1. The NFI bit in fallback DCI is not toggled compared to previous DCI indicating same PDSCH group index if the counter DAI in the fallback DCI is not reset to the initial value, namely, the value of counter DAI is larger than the initial value, i.e., 0 or 1. The value of the counter DAI in the next non-fallback DCI indicating group 0 and valid PDSCH to HARQ timing indication follows the value of the counter DAI in the fallback DCI. For example, in FIG. 5B, the value of the C-DAI in the 1$^{st}$ FB-DCI is 1, and the value of the C-DAI in the 2$^{nd}$ NFB-DCI is 2.

Figure 6A:
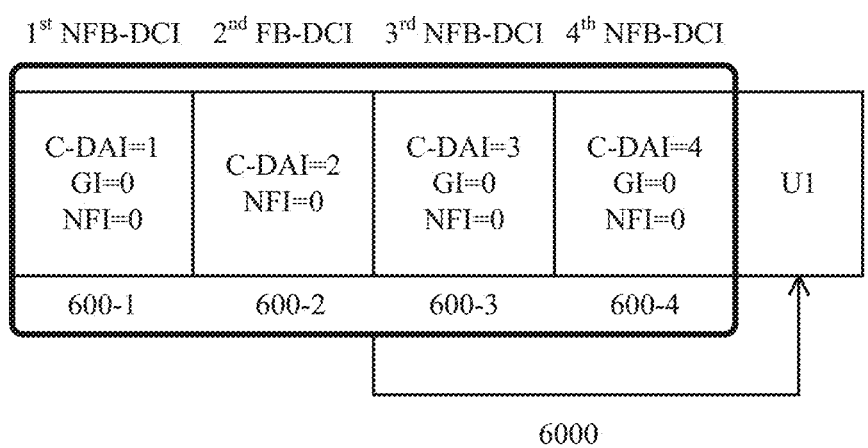
FIG. 6A illustrates one enhanced dynamic HARQ-ACK codebook determination with PDSCHs scheduled by fallback DCI according to some embodiments of the subject disclosure.

FIG. 6A illustrates yet another enhanced dynamic HARQ-ACK codebook determination with PDSCHs scheduled by fallback DCI according to some embodiments of the subject disclosure. In FIG. 6A, there are four PDSCHs, PDSCH 600-1, PDSCH 600-2, PDSCH 600-3 and PDSCH 600-4. PDSCH 600-1, PDSCH 600-3 and PDSCH 600-4 are scheduled by the non-fallback DCI, and PDSCH 600-2 is scheduled by the fallback DCI. The C-DAI for the four PDSCHs, PDSCH 600-1, PDSCH 600-2, PDSCH 600-3 and PDSCH 600-4 are 1, 2, 3, and 4, respectively, and the value of GI for PDSCH 600-1, PDSCH 600-2, and PDSCH 600-4 is 0.

In this embodiment, the PDSCH scheduled by the fallback DCI always belongs to PDSCH group 0, therefore, the four PDSCH 600-4, PDSCH 600-1, PDSCH 600-3 and PDSCH 600-4 belong to the same PDSCH group, PDSCH group 0, and the codebook 6000 for PDSCH group 0 is to be transmitted in slot U1.

In FIG. 6A, maximum 2 PDSCH groups are supported for enhanced dynamic HARQ-ACK codebook. The HARQ-ACK feedback timing indicator for the PDSCH scheduled by the 2$^{nd}$ fallback DCI is used to indicate the slot-level timing offset between the PDSCH and the corresponding HARQ-ACK feedback, e.g., slot U1 is indicated for HARQ-ACK feedback transmission. The next non-fallback DCI, the 3$^{rd}$ NFB-DCI, which also has a GI with a value of 0, and also indicates the HARQ-ACK feedback to be transmitted in the same slot, e.g., slot U1, requests the HARQ-ACK feedback for the PDSCH group 0 which includes the PDSCHs scheduled by fallback DCI and non-fallback DCI.

In this embodiment, if the C-DAI in the fallback DCI is not reset to the initial value, which may be predefined as 0 or 1, in other words, if the value of the counter DAI is greater than the initial value, the NFI for the fallback DCI is assumed not toggled compared to the previous and/or next non-fallback DCI with a GI value of 0 with the same slot for PUCCH transmission indicated by HARQ timing indication fields, which is illustrated in FIG. 6A.

For example, in FIG. 6A, the C-DAI in the $2^{nd}$ fallback DCI is 2, which is not the initial value, the NFI for $1^{st}$ non-fallback DCI is also 0, and the $1^{st}$ non-fallback DCI indicates the same slot for PUCCH transmission, then the NFI for the $2^{nd}$ fallback DCI is assumed not toggled compared to the previous non-fallback DCI, which is the $1^{st}$ non-fallback DCI. Similarly, the NFI for $3^{rd}$ non-fallback DCI is also 0, and the $3^{rd}$ non-fallback DCI indicates the same slot for PUCCH transmission. Then the NFI for the $2^{nd}$ fallback DCI is assumed not toggled compared to the next non-fallback DCI, the $3^{rd}$ non-fallback DCI.

Figure 6B:
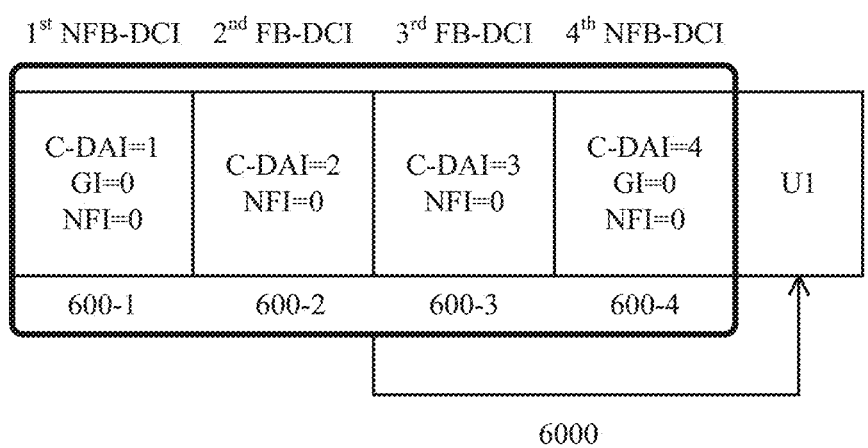
FIG. 6B illustrates one enhanced dynamic HARQ-ACK codebook determination with PDSCHs scheduled by fallback DCI according to some embodiments of the subject disclosure.

In FIG. 6B, the C-DAI in the $2^{nd}$ fallback DCI is 2, which is not the initial value, the NFI for the $2^{nd}$ fallback DCI is assumed not toggled compared to the previous non-fallback DCI, the $1^{st}$ non-fallback DCI, and/or not toggled compared to the next non-fallback DCI, which is the $4^{th}$ non-fallback DCI. If the $4^{th}$ DCI is also a fallback DCI, then the UE keeps searching for the next non-fallback DCI until a non-fallback DCI is found. Likewise, if the $1^{st}$ DCI is also a fallback DCI, then the UE keeps searching for the previous non-fallback DCI until a non-fallback DCI is found. Similarly, the C-DAI in the $3^{rd}$ fallback DCI is 3, which is not the initial value, the NFI for the fallback DCI is assumed not toggled compared to the previous non-fallback DCI, the $1^{st}$ non-fallback DCI, and/or not toggled compared to the next non-fallback DCI, the $4^{th}$ non-fallback DCI.

If the C-DAI in the fallback DCI is reset to the initial value, "reset" means the value of counter DAI is equal to the initial value, which may be predefined as 0 or 1, the NFI for the $1^{st}$ fallback DCI is assumed not toggled compared to the next non-fallback DCI with GI of 0 with the same slot for PUCCH transmission indicated by HARQ timing indication field. For example, in FIG. 6C, the C-DAI in the $1^{st}$ fallback DCI is 1, which is the initial value, the NFI for the $1^{st}$ fallback DCI is assumed not toggled compared to the next non-fallback DCI, which is the 2nd non-fallback DCI.

Figure 6C:
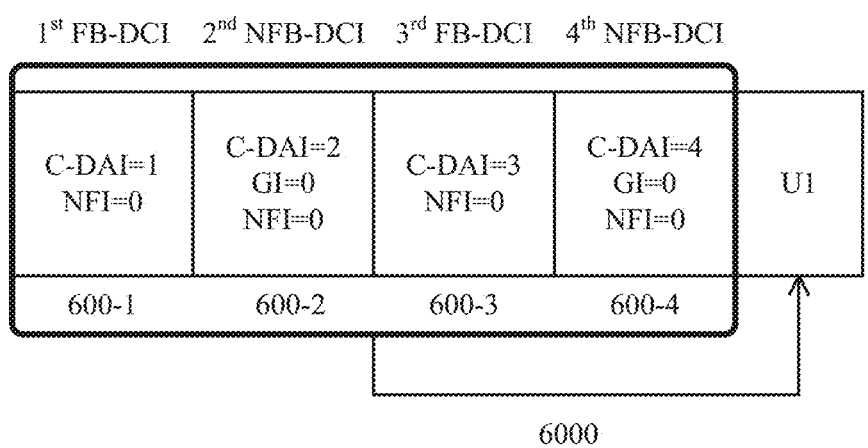
FIG. 6C illustrates one enhanced dynamic HARQ-ACK codebook determination with PDSCHs scheduled by fallback DCI according to some embodiments of the subject disclosure.

In the embodiments in FIGS. 6A, 6B, and 6C, the term "next" non-fallback DCI means the DCI format 1_1 indicating group index of 0 and indicting the value of the counter DAI following the counter DAI of the fallback DCI and indicating the same slot for PUCCH transmission by HARQ timing indication field. E.g., in FIG. 6B, the $4^{th}$ NFB-DCI is the "next" DCI compared to the $2^{nd}$ FB-DCI. Correspondingly, the "previous" non-fallback DCI means the DCI format 1_1 indicating group index of 0 and indicting the value of the counter DAI preceding the counter DAI of the fallback DCI and indicating the same slot for PUCCH transmission by HARQ timing indication field. For instance, in FIG. 6B, $1^{st}$ NFB-DCI is the "previous" DCI compared to the $3^{rd}$ FB-DCI.

In another preferred embodiment, maximum 4 PDSCH groups are supported for enhanced dynamic HARQ-ACK codebook. The maximum number of supported PDSCH groups is configured for a UE via RRC signaling. If maximum N PDSCH groups are configured, 1<=N<=4, then $\lceil \log_2 N \rceil$ bits are required as GI in non-fallback DCI. The PDSCHs scheduled by fallback DCI, i.e., DCI format 1_0, always belong to PDSCH group 0, therefore, no GI is included in the fallback DCI. The PDSCHs scheduled by the non-fallback DCI, i.e., DCI format 1_1, are indicated with PDSCH group index.

When one non-fallback DCI is used to request HARQ-ACK feedback for more than one PDSCH group, a bitmap based solution in a non-fallback DCI is used to indicate the requested PDSCH group(s), wherein the length of the bitmap is equal to N and each bit in the bitmap corresponds to one PDSCH group. Meanwhile, another bitmap in the non-fallback DCI is used to indicate the NFI bit per requested PDSCH group, the length of this bitmap is also equal to N. In this alternative, the non-fallback DCI is not used to schedule PDSCH transmission or PUSCH transmission, so some fields in the DCI can be reused as the bitmap indicating requested PDSCH group(s), e.g., reusing time domain resource allocation field as the bitmap, and the bitmap indicating NFI bits for the configured PDSCH group(s), e.g., reusing HARQ process number field as this bitmap. Other fields related to PUCCH transmission, e.g., PUCCH resource indication, TPC for PUCCH, HARQ timing indicator, in the DCI, remain unchanged.

In another embodiment, maximum 4 PDSCH groups are supported for enhanced dynamic HARQ-ACK codebook. Two bits are required as GI in non-fallback DCI. The limitation is that one DCI can request HARQ-ACK feedback for up to 2 PDSCH groups. The PDSCHs scheduled by the fallback DCI, i.e., DCI format 1_0, always belong to PDSCH group 0. The PDSCHs scheduled by non-fallback DCI, i.e., DCI format 1_1, are indicated with PDSCH group 0, 1, 2 or 3. When one non-fallback DCI is used to request HARQ-ACK feedback for two PDSCH groups, wherein one group is the scheduled group with group index indicated in the non-fallback DCI and the other group is non-scheduled group, the index of the non-scheduled group is indicated by RI. Two bits are required in the non-fallback DCI for the RI to indicate the index of the non-scheduled group.

Based on the above embodiment, the NFI value for the fallback DCI is determined, and the UE can determine whether to transmit the feedback for the PDSCH scheduled by the fallback DCI, and the same understanding on dynamic HARQ-ACK codebook between gNB and UE is guaranteed.

Figure 7:
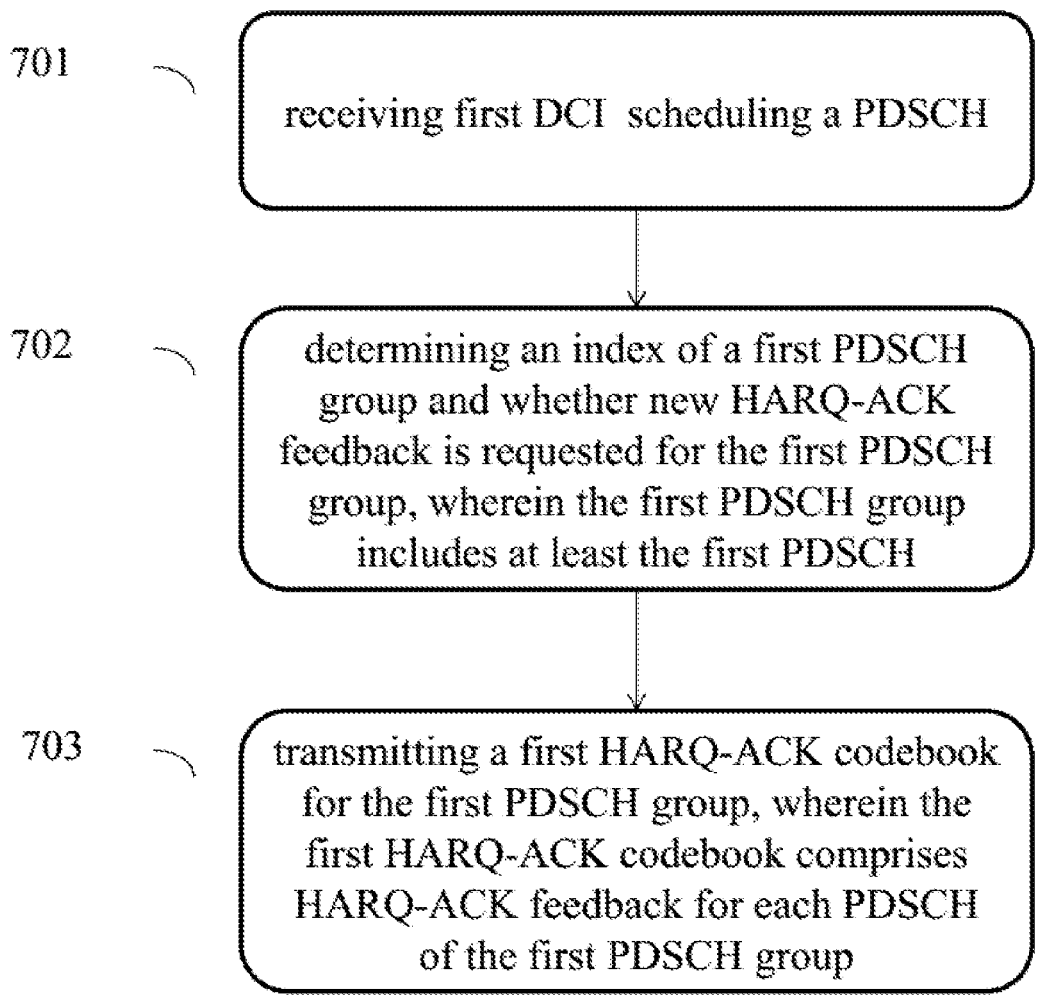
FIG. 7 illustrates a method performed by a UE for wireless communication according to a preferred embodiment of the subject disclosure.

FIG. 7 illustrates a method according to a preferred embodiment of the subject disclosure. In step 701, the UE (e.g., UE 101 as shown in FIG. 1) receives first DCI scheduling a first PDSCH, for example, the UE receives a fallback DCI, which schedules a PDSCH. In step 702, the UE determines an index of a first PDSCH group and whether new HARQ-ACK feedback is requested for the first PDSCH group, wherein the first PDSCH group includes at least the first PDSCH; and in step 703, the UE transmits a first HARQ-ACK codebook for the first PDSCH group, wherein the first HARQ-ACK codebook comprises HARQ-ACK feedback for each PDSCH of the first PDSCH group.

In one embodiment, the UE determines the index of the first PDSCH group is based on the GI in the fallback DCI. For example, as shown in FIG. 5B, a bit in the PDSCH-to-HARQ_feedback timing indicator in the fallback DCI is reused as the GI.

In another embodiment, the UE determines whether the new HARQ-ACK feedback is requested for the first PDSCH group is based on the NFI in the fallback DCI which indicates whether the new HARQ-ACK feedback is requested for the first PDSCH group. For example, as shown in FIG. 5A, a field of PDSCH-to-HARQ_feedback timing indicator in the fallback DCI is reused as the NFI.

In one embodiment, if the UE determines that the DCI does not include a GI, the UE may determine the GI for the DCI is zero (0).

In another embodiment, if the fallback DCI does not include the GI or the NFI, the UE determines whether the new HARQ-ACK feedback is requested for the first PDSCH group based on the non-fallback DCI. The non-fallback DCI schedules a second PDSCH which includes the GI and the NFI. For example, in FIG. 6A, the 3$^{rd}$ non-fallback DCI schedules a PDSCH which has the GI with a value of 0, and the NFI with a value of 0. Furthermore, the fallback DCI and the non-fallback DCI all indicate the same slot where the first HARQ-ACK codebook is to be transmitted. For example, the fallback DCI and the non-fallback DCI in FIG. 6A all indicate the slot U1 when the codebook 6000 is to be transmitted.

In one embodiment, the value of the C-DAI of the fallback DCI is reset, for example, the value of the C-DAI of the 1$^{st}$ fallback DCI in FIG. 6C is 1, which is the initial value, the 2$^{nd}$ non-fallback DCI is received later than the fallback DCI, the value of the C-DAI in the 2$^{nd}$ non-fallback DCI is 2, which is greater than the value of a C-DAI in the fallback DCI.

In another embodiment, the value of the C-DAI of the fallback DCI is not reset, for example, the value of the C-DAI of the 2$^{nd}$ fallback DCI in FIG. 6A is 2, which is not the initial value, the 3$^{rd}$ non-fallback DCI is received later than the fallback DCI, the value of the C-DAI in the 3$^{rd}$ non-fallback DCI is 3, which is greater than the value of a C-DAI in the fallback DCI. In still another embodiment, the value of the C-DAI of the fallback DCI is not reset, for example, the value of the C-DAI of the 2$^{nd}$ fallback DCI in FIG. 6A is 2, which is not the initial value, the 1$^{st}$ non-fallback DCI is received earlier than the fallback DCI, the value of the C-DAI in the 1$^{st}$ non-fallback DCI is 1, which is less than the value of a C-DAI in the fallback DCI.

In one embodiment, the non-fallback DCI also includes a RI, which indicates the index of the second PDSCH group where the second PDSCH is included, and the first HARQ-ACK codebook further includes HARQ-ACK feedback for each PDSCH of the second PDSCH group. The non-fallback DCI further includes NFI for the scheduled PDSCH group which indicates whether new HARQ-ACK feedback is requested for the second PDSCH group. The non-fallback DCI further includes NFI for the non-scheduled PDSCH group which indicates whether HARQ-ACK feedback for the first PDSCH group is included in the same HARQ-ACK codebook with HARQ-ACK feedback for the second PDSCH group. The non-fallback DCI further includes two-bit RI for indicating a total number of PDSCH groups with corresponding HARQ-ACK feedback in the same HARQ-ACK codebook.

In one embodiment, the UE receives a dedicated DCI, which requesting HARQ-ACK feedback for one or more PDSCH groups of a plurality of PDSCH groups in a second HARQ-ACK codebook, and transmits the second HARQ-ACK codebook, wherein the second HARQ-ACK codebook comprises HARQ-ACK feedback for each PDSCH of the one or more PDSCH groups. The maximum number of the plurality of PDSCH groups is configured by RRC signaling. The dedicated DCI includes a GI bitmap, each bit in the GI bitmap requests HARQ-ACK feedback for one corresponding PDSCH group of the plurality of PDSCH groups. Alternatively, the dedicated DCI includes a NFI bitmap, and each bit in the NFI bitmap indicates whether new HARQ-ACK feedback is requested for one corresponding PDSCH group of the plurality of PDSCH groups.

In another embodiment, the UE receives a non-fallback DCI, which requests the HARQ-ACK feedback for maximum two PDSCH groups of a plurality of PDSCH groups in a second HARQ-ACK codebook; the UE then transmits the second HARQ-ACK codebook, and the second HARQ-ACK codebook includes HARQ-ACK feedback for each PDSCH of the maximum two PDSCH groups. The non-fallback DCI also schedules a second PDSCH and the second PDSCH is not within the first PDSCH group. The non-fallback DCI also schedules an indicator indicating an index of the first PDSCH group.

In still another embodiment, if new HARQ-ACK feedback is requested for the first PDSCH group, the UE then excludes PDSCHs received earlier than the first PDSCH within the first PDSCH group, else if new HARQ-ACK feedback is not requested for the first PDSCH group, the UE then includes PDSCHs received earlier than the first PDSCH within the first PDSCH group.

Figure 8:
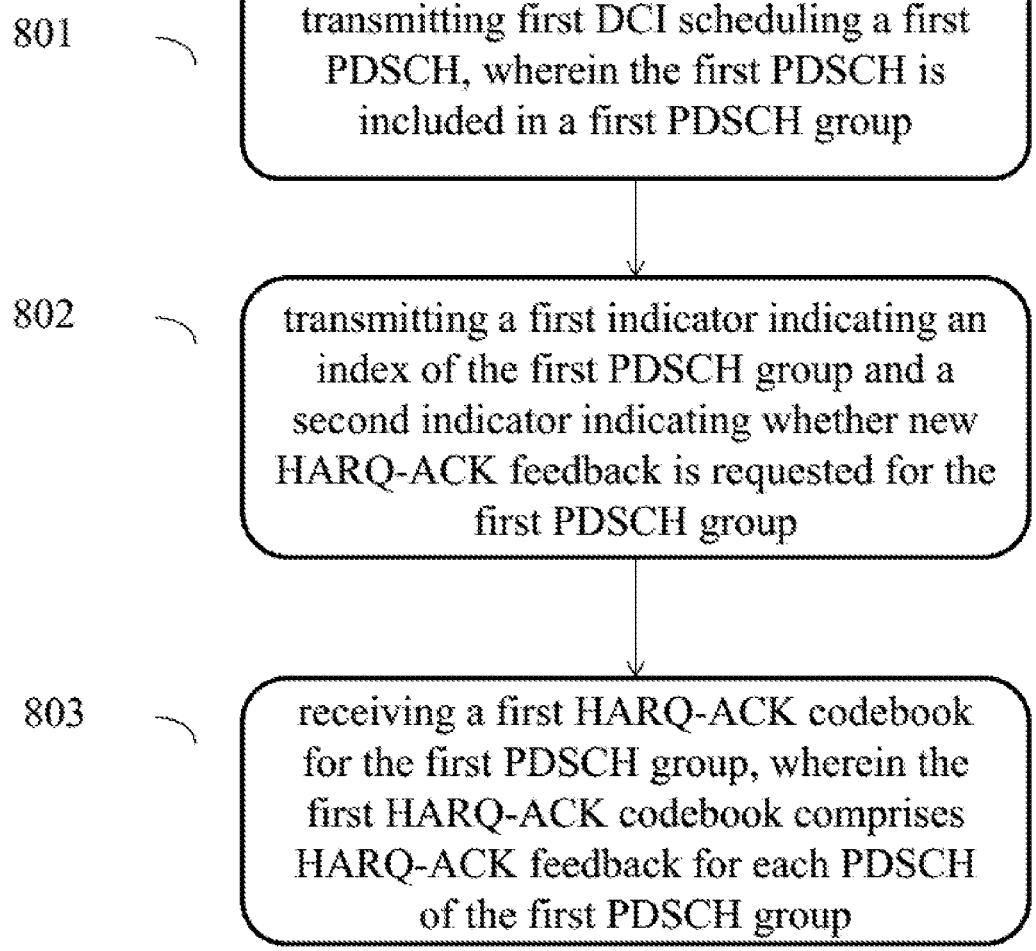
FIG. 8 illustrates a method performed by a BS for wireless communication according to a preferred embodiment of the subject disclosure.

FIG. 8 illustrates a method according to a preferred embodiment of the subject disclosure. In step 801, the BS (e.g., BS 102 as shown in FIG. 1) transmits first DCI scheduling a first PDSCH, for example, the BS transmits a fallback DCI, wherein the first PDSCH is included in a first PDSCH group. In step 802, the BS transmits transmitting a first indicator indicating an index of the first PDSCH group, for example, the GI, and a second indicator indicating whether new HARQ-ACK feedback is requested for the first PDSCH group, for example, the NFI; and in step 803, the BS receives a first HARQ-ACK codebook for the first PDSCH group, wherein the first HARQ-ACK codebook comprises HARQ-ACK feedback for each PDSCH of the first PDSCH group. The GI is included in the fallback DCI. For example, as shown in FIG. 5B, a bit in the PDSCH-to-HARQ_feedback timing indicator in the fallback DCI is reused as the GI. The NFI may also be includes in the first DCI, and as shown in FIG. 5A, a field of PDSCH-to-HARQ_feedback timing indicator in the fallback DCI is reused as the NFI.

In one embodiment, if the UE determines that the DCI does not include a GI, the UE may determine the GI for the DCI is zero (0). In another embodiment, if the fallback DCI does not include the GI or the NFI, the NFI is included in the non-fallback DCI. The non-fallback DCI schedules a second PDSCH which includes the GI and the NFI, and the GI indicates the index of the first PDSCH group is 0. Furthermore, the fallback DCI and the non-fallback DCI all indicate the same slot where the first HARQ-ACK codebook is to be transmitted. For example, the 1$^{st}$ fallback DCI and three non-fallback DCI in FIG. 6A all indicate the slot U1 where the HARQ-ACK codebook 6000 is to be transmitted.

In one embodiment, the value of the C-DAI of the fallback DCI is reset, for example, the value of the C-DAI of the fallback DCI in FIG. 6C is 1, which is the initial value, the 2$^{nd}$ non-fallback DCI is transmitted later than the fallback DCI, the value of the C-DAI in the 2$^{nd}$ non-fallback DCI is 2, which is greater than the value of a C-DAI in the fallback DCI.

In another embodiment, the value of the C-DAI of the fallback DCI is not reset, for example, the value of the C-DAI of the 2$^{nd}$ fallback DCI in FIG. 6A is 2, which is not the initial value, the 3$^{rd}$ non-fallback DCI is transmitted later than the fallback DCI, the value of the C-DAI in the 3$^{rd}$ non-fallback DCI is 3, which is greater than the value of a C-DAI in the fallback DCI. In still another embodiment, the value of the C-DAI of the fallback DCI is not reset, for example, the value of the C-DAI of the 2$^{nd}$ fallback DCI in FIG. 6A is 2, which is not the initial value, the 1$^{st}$ non-fallback DCI is transmitted earlier than the fallback DCI, the value of the C-DAI in the 1$^{st}$ non-fallback DCI is 1, which is less than the value of a C-DAI in the fallback DCI.

In one embodiment, the non-fallback DCI also includes a RI, which indicates the index of the second PDSCH group where the second PDSCH is included, and the first HARQ-ACK codebook further includes HARQ-ACK feedback for each PDSCH of the second PDSCH group. The non-fallback DCI further includes NFI for the scheduled PDSCH group which indicates whether new HARQ-ACK feedback is requested for the second PDSCH group. The non-fallback DCI also includes NFI for the non-scheduled PDSCH group which indicates whether HARQ-ACK feedback for the first PDSCH group is included in the same HARQ-ACK codebook with HARQ-ACK feedback for the second PDSCH group. The non-fallback DCI further includes two-bit RI for indicating a total number of PDSCH groups with the corresponding HARQ-ACK feedback in the same HARQ-ACK codebook.

In one embodiment, the BS transmits a dedicated DCI, which requests HARQ-ACK feedback for one or more PDSCH groups of a plurality of PDSCH groups in a second HARQ-ACK codebook, and transmits the second HARQ-ACK codebook, wherein the second HARQ-ACK codebook comprises HARQ-ACK feedback for each PDSCH of the one or more PDSCH groups. The maximum number of the plurality of PDSCH groups is configured by RRC signaling. The dedicated DCI includes a GI bitmap, each bit in the GI bitmap requests HARQ-ACK feedback for one corresponding PDSCH group of the plurality of PDSCH groups. Alternatively, the dedicated DCI includes a NFI bitmap, and each bit in the NFI bitmap indicates whether new HARQ-ACK feedback is requested for one corresponding PDSCH group of the plurality of PDSCH groups.

In another embodiment, the BS transmits a non-fallback DCI, which requests the HARQ-ACK feedback for maximum two PDSCH groups of a plurality of PDSCH groups in a second HARQ-ACK codebook; the BS then receives the second HARQ-ACK codebook, and the second HARQ-ACK codebook comprises HARQ-ACK feedback for each PDSCH of the maximum two PDSCH groups. The non-fallback DCI also schedules a second PDSCH and the second PDSCH is not within the first PDSCH group. The non-fallback DCI also schedules an indicator indicating an index of the first PDSCH group.

In still another embodiment, if new HARQ-ACK feedback is requested for the first PDSCH group, the BS then excludes PDSCHs transmitted earlier than the first PDSCH within the first PDSCH group, else if new HARQ-ACK feedback is not requested for the first PDSCH group, the BS then includes PDSCHs transmitted earlier than the first PDSCH within the first PDSCH group.

Figure 9:
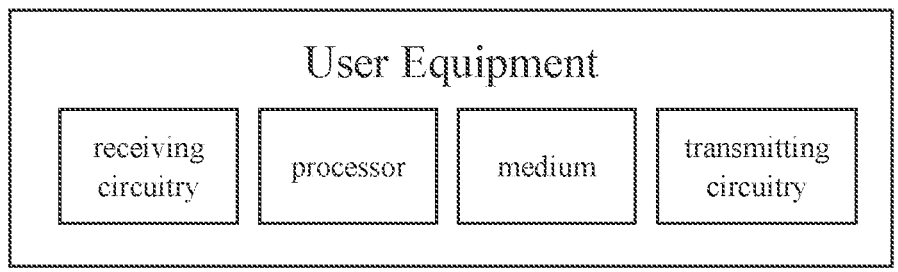
FIG. 9 illustrates a block diagram of a UE according to the embodiments of the subject disclosure.

FIG. 9 illustrates a block diagram of a UE according to the embodiments of the subject disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 7) with the receiving circuitry, the transmitting circuitry and the processor. That is, the receiving circuitry may receive, DCI scheduling a first PDSCH, the processor then determines an index of a first PDSCH group and whether new HARQ-ACK feedback is requested for the first PDSCH group, the transmitting circuitry may transmit a first HARQ-ACK codebook for the first PDSCH group, wherein the first HARQ-ACK codebook comprises HARQ-ACK feedback for each PDSCH of the first PDSCH group.

Figure 10:
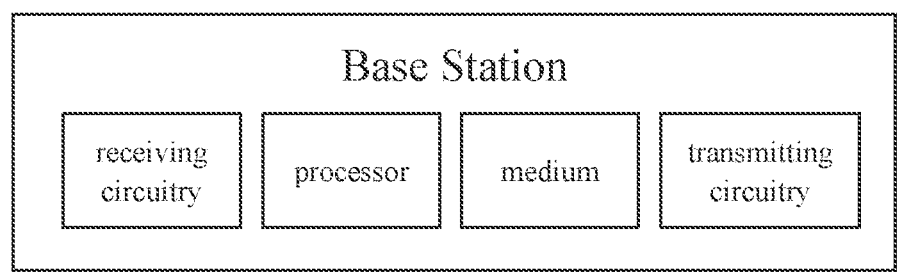
FIG. 10 illustrates a block diagram of a BS according to the embodiments of the subject disclosure.

FIG. 10 illustrates a block diagram of a BS according to the embodiments of the subject disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 8) with the receiving circuitry, the transmitting circuitry and the processor. That is, the transmitting circuitry transmits first DCI scheduling a first PDSCH and a first indicator indicating an index of the first PDSCH group and a second indicator indicating whether new HARQ-ACK feedback is requested for the first PDSCH group; and the receiving circuitry receives a first HARQ-ACK codebook for the first PDSCH group, wherein the first HARQ-ACK codebook comprises HARQ-ACK feedback for each PDSCH of the first PDSCH group.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:
1. A method, comprising:
  receiving first Downlink Control Information (DCI) scheduling a first Physical Downlink Shared Channel (PDSCH);

determining an index of a first PDSCH group is zero in response to the first DCI not including a first indicator that indicates the index of the first PDSCH group, wherein the first PDSCH group includes at least the first PDSCH;

determining whether new Hybrid Automatic Repeat reQuest Acknowledgement (HARQ-ACK) feedback is requested for the first PDSCH group; and transmitting a first HARQ-ACK codebook for the first PDSCH group, wherein the first HARQ-ACK codebook includes HARQ-ACK feedback for each PDSCH of the first PDSCH group.

2. The method of claim 1, wherein determining whether the new HARQ-ACK feedback is requested for the first PDSCH group is based on second DCI in response to the first DCI not including the first indicator indicating the index of the first PDSCH group and the first DCI not including a second indicator indicating whether the new HARQ-ACK feedback is requested for the first PDSCH group.

3. An apparatus, comprising:
a receiving circuitry;
a transmitting circuitry; and
a processor coupled to the receiving circuitry and the transmitting circuitry, the processor, the receiving circuitry, and the transmitting circuitry configured to cause the apparatus to:
receive first Downlink Control Information (DCI) scheduling a first Physical Downlink Shared Channel (PDSCH);
determine an index of a first PDSCH group is zero in response to the first DCI not including a first indicator that indicates the index of the first PDSCH group, wherein the first PDSCH group includes at least the first PDSCH;
determine whether new Hybrid Automatic Repeat reQuest Acknowledgement (HARQ-ACK) feedback is requested for the first PDSCH group; and
transmit a first HARQ-ACK codebook for the first PDSCH group, wherein the first HARQ-ACK codebook includes HARQ-ACK feedback for each PDSCH of the first PDSCH group.

4. The apparatus of claim 3, wherein to determine whether the new HARQ-ACK feedback is requested for the first PDSCH group is based on a second indicator in the first DCI which indicates whether the new HARQ-ACK feedback is requested for the first PDSCH group.

5. The apparatus of claim 3, wherein to determine whether the new HARQ-ACK feedback is requested for the first PDSCH group is based on second DCI in response to the first DCI not including the first indicator that indicates the index of the first PDSCH group and the first DCI not including a second indicator that indicates whether the new HARQ-ACK feedback is requested for the first PDSCH group.

6. The apparatus of claim 5, wherein the second DCI schedules a second PDSCH and includes the first indicator and the second indicator.

7. The apparatus of claim 6, wherein the second DCI further includes a third indicator that indicates an index of a second PDSCH group including the second PDSCH, wherein the first HARQ-ACK codebook further includes HARQ-ACK feedback for each PDSCH of the second PDSCH group.

8. The apparatus of claim 7, wherein the second DCI includes a fourth indicator that indicates whether new HARQ-ACK feedback is requested for the second PDSCH group.

9. The apparatus of claim 7, wherein the second DCI includes a fourth indicator that indicates whether HARQ-ACK feedback for the first PDSCH group is included in a same HARQ-ACK codebook with HARQ-ACK feedback for the second PDSCH group.

10. The apparatus of claim 7, wherein the second DCI includes a fourth indicator that indicates a total number of PDSCH groups with corresponding HARQ-ACK feedback in a same HARQ-ACK codebook.

11. The apparatus of claim 5, wherein the second DCI is received later than the first DCI, and wherein a value of a counter Downlink Assignment Index (DAI) associated with the second DCI is greater than a value of a counter DAI associated with the first DCI in response to the value of the counter DAI associated with the first DCI being reset.

12. The apparatus of claim 5, wherein the second DCI is received earlier than the first DCI, and wherein a value of a counter Downlink Assignment Index (DAI) associated with the first DCI is greater than a value of a counter DAI associated with the second DCI in response to the value of the counter DAI associated with the first DCI not being reset.

13. The apparatus of claim 5, wherein the first DCI and the second DCI indicate a same slot where the first HARQ-ACK codebook is to be transmitted.

14. The apparatus of claim 3, wherein the processor, the receiving circuitry, and the transmitting circuitry are further configured to cause the apparatus to:
receive a second DCI requesting HARQ-ACK feedback for one or more PDSCH groups of a plurality of PDSCH groups in a second HARQ-ACK codebook; and
transmit the second HARQ-ACK codebook, wherein the second HARQ-ACK codebook includes HARQ-ACK feedback for each PDSCH of the one or more PDSCH groups.

15. The apparatus of claim 14, wherein the second DCI includes a bitmap, and wherein each bit of the bitmap indicates whether HARQ-ACK feedback is requested for a PDSCH group of the plurality of PDSCH groups.

16. The apparatus of claim 14, wherein the second DCI includes a bitmap, and wherein each bit of the bitmap indicates whether new HARQ-ACK feedback is requested for a PDSCH group of the plurality of PDSCH groups.

17. The apparatus of claim 3, wherein the processor, the receiving circuitry, and the transmitting circuitry are further configured to cause the apparatus to:
receive a second DCI requesting HARQ-ACK feedback for a maximum number of PDSCH groups of a plurality of PDSCH groups in a second HARQ-ACK codebook, wherein the maximum number of PDSCH groups is two PDSCH groups; and
transmit the second HARQ-ACK codebook, wherein the second HARQ-ACK codebook includes HARQ-ACK feedback for each PDSCH of the two PDSCH groups.

18. The apparatus of claim 17, wherein the second DCI schedules a second PDSCH and the second PDSCH is not within the first PDSCH group.

19. The apparatus of claim 3, wherein the processor, the receiving circuitry, and the transmitting circuitry are further configured to cause the apparatus to:
determine one or more PDSCHs received earlier than the first PDSCH are excluded from the first PDSCH group in response to the new HARQ-ACK feedback being requested for the first PDSCH group; or
determine one or more PDSCHs received earlier than the first PDSCH are included in the first PDSCH group in response to the new HARQ-ACK feedback not being requested for the first PDSCH group.

20. An apparatus, comprising:
a receiving circuitry;
a transmitting circuitry; and
a processor coupled to the receiving circuitry and the transmitting circuitry, the processor, the receiving circuitry, and the transmitting circuitry configured to cause the apparatus to:
transmit first Downlink Control Information (DCI) scheduling a first Physical Downlink Shared Channel (PDSCH), wherein the first PDSCH is included in a first PDSCH group, and wherein an index of the first PDSCH group is zero in response to the first DCI not including a first indicator that indicates the index of the first PDSCH group;
transmit a second indicator that indicates whether new Hybrid Automatic Repeat reQuest Acknowledgement (HARQ-ACK) feedback is requested for the first PDSCH group; and
receive a first HARQ-ACK codebook for the first PDSCH group, wherein the first HARQ-ACK codebook includes HARQ-ACK feedback for each PDSCH of the first PDSCH group.

* * * * *